(12) United States Patent
Stewart

(10) Patent No.: US 12,112,225 B2
(45) Date of Patent: Oct. 8, 2024

(54) TAG TRACKING / DETECTION SYSTEM HAVING A REFLECTIVE SURFACE

(71) Applicant: Sensormatic Electronics, LLC, Boca Raton, FL (US)

(72) Inventor: Michael C. Stewart, Delray Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 122 days.

(21) Appl. No.: 17/868,508

(22) Filed: Jul. 19, 2022

(65) Prior Publication Data

US 2023/0025605 A1    Jan. 26, 2023

Related U.S. Application Data

(60) Provisional application No. 63/223,801, filed on Jul. 20, 2021.

(51) Int. Cl.
*G06K 7/10* (2006.01)
*G06Q 10/087* (2023.01)
*G08B 21/24* (2006.01)

(52) U.S. Cl.
CPC ....... *G06K 7/10366* (2013.01); *G06Q 10/087* (2013.01); *G08B 21/24* (2013.01)

(58) Field of Classification Search
None
See application file for complete search history.

(56) References Cited

U.S. PATENT DOCUMENTS

| | | | |
|---|---|---|---|
| 7,768,392 B1* | 8/2010 | Brand | G01D 21/00 340/539.13 |
| 8,447,188 B2* | 5/2013 | Scott | G02B 5/124 398/169 |
| 9,792,796 B1* | 10/2017 | Lauka | G08B 21/02 |
| 10,402,600 B1* | 9/2019 | Martin | G06K 7/10316 |
| 10,410,027 B1* | 9/2019 | Song | G06K 7/10475 |
| 11,797,791 B2* | 10/2023 | Matsuura | G06K 7/10316 |
| 2014/0232531 A1* | 8/2014 | Stewart | G07G 1/0054 340/10.5 |
| 2017/0344770 A1* | 11/2017 | Oishi | G06K 7/10366 |
| 2018/0182236 A1* | 6/2018 | Hor-Lao | G08B 21/0438 |
| 2018/0336383 A1* | 11/2018 | Roth | G06K 7/10316 |
| 2019/0027002 A1* | 1/2019 | Esenwein | H04W 4/021 |
| 2019/0087772 A1* | 3/2019 | Medina | G05D 1/0246 |
| 2019/0311164 A1* | 10/2019 | Teter | G06K 7/10415 |

(Continued)

*Primary Examiner* — Muhammad Adnan
(74) *Attorney, Agent, or Firm* — ArentFox Schiff LLP

(57) ABSTRACT

Example aspects include methods, apparatuses, and computer-readable medium for receiving, by an antenna of a tag tracking/detection system, a tag signal of a tag in the tag tracking/detection system; determining, based on a strength or pattern of the tag signal, whether the tag signal comprises a reflected signal that is reflected by one or more reflective surfaces, wherein the one or more reflective surfaces are configured to focus tag signals of tags in a target location of the tag tracking/detection system toward the antenna of the tag tracking/detection system; and generating an output signal responsive to the tag signal comprising the reflected signal that is reflected by the one or more reflective surfaces, wherein the output signal is indicative of the tag being detected in the target location.

19 Claims, 4 Drawing Sheets

(56) References Cited

U.S. PATENT DOCUMENTS

| | | | |
|---|---|---|---|
| 2021/0110689 A1* | 4/2021 | Allen | G08B 13/1436 |
| 2021/0158125 A1* | 5/2021 | Forster | G06K 19/0723 |
| 2021/0342560 A1* | 11/2021 | Wan | G06K 7/10425 |
| 2021/0390287 A1* | 12/2021 | Rozner | G06V 20/52 |
| 2022/0141619 A1* | 5/2022 | Parikh | H04W 4/029 |
| | | | 455/456.1 |
| 2022/0269873 A1* | 8/2022 | Matsuura | H01Q 15/14 |

* cited by examiner

TAG TRACKING / DETECTION SYSTEM HAVING A REFLECTIVE SURFACE

CROSS REFERENCE TO RELATED APPLICATION(S)

This application claims priority to U.S. Provisional Application Ser. No. 63/223,801, entitled "LOSS PREVENTION SYSTEM HAVING A REFLECTIVE SURFACE" and filed on Jul. 20, 2021, which is expressly incorporated by reference herein in the entirety.

BACKGROUND

The present disclosure relates generally to tag tracking/detection systems, and more specifically, to a tag tracking/detection system having a reflective surface, which may improve an accuracy of reading a signal from an electronic tag.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method comprising receiving, by an antenna of a tag tracking/detection system, a tag signal of a tag in the tag tracking/detection system. The method further comprises determining, based on a strength or pattern of the tag signal, whether the tag signal comprises a reflected signal that is reflected by one or more reflective surfaces, wherein the one or more reflective surfaces are configured to focus tag signals of tags in a target location of the tag tracking/detection system toward the antenna of the tag tracking/detection system. The method further comprises generating an output signal responsive to the tag signal comprising the reflected signal that is reflected by the one or more reflective surfaces, wherein the output signal is indicative of the tag being detected in the target location.

Another example implementation includes a tag tracking/detection system comprising an antenna; and one or more reflective surfaces configured to focus tag signals of tags in a target location of the tag tracking/detection system toward the antenna of the tag tracking/detection system.

Another example implementation includes a computer-readable medium storing instructions that, when executed by a processor, cause the processor to receive, by an antenna of a tag tracking/detection system, a tag signal of a tag in the tag tracking/detection system. The instructions, when executed by the processor, further cause the processor to determine, based on a strength or pattern of the tag signal, whether the tag signal comprises a reflected signal that is reflected by one or more reflective surfaces, wherein the one or more reflective surfaces are configured to focus tag signals of tags in a target location of the tag tracking/detection system toward the antenna of the tag tracking/detection system. The instructions, when executed by the processor, further cause the processor to generate an output signal responsive to the tag signal comprising the reflected signal that is reflected by the one or more reflective surfaces.

Another example implementation includes an apparatus comprising means for receiving, by an antenna of a tag tracking/detection system, a tag signal of the tag in the tag tracking/detection system. The apparatus further comprises means for determining, based on a strength or pattern of the tag signal, whether the tag signal comprises a reflected signal that is reflected by one or more reflective surfaces, wherein the one or more reflective surfaces are configured to focus tag signals of tags in a target location of the tag tracking/detection system toward the antenna of the tag tracking/detection system. The apparatus further comprises means for generating an output signal responsive to the tag signal comprising the reflected signal that is reflected by the one or more reflective surfaces, wherein the output signal is indicative of the tag being detected in the target location.

Another example implementation includes an apparatus comprising a memory storing instructions and a processor communicatively coupled with the memory. The instructions, when executed by the processor, cause the processor to receive, by an antenna of a tag tracking/detection system, a tag signal of a tag in the tag tracking/detection system. The instructions, when executed by the processor, further cause the processor to determine, based on a strength or pattern of the tag signal, whether the tag signal comprises a reflected signal that is reflected by one or more reflective surfaces, wherein the one or more reflective surfaces are configured to focus tag signals of tags in a target location of the tag tracking/detection system toward the antenna of the tag tracking/detection system. The instructions, when executed by the processor, further cause the processor to generate an output signal responsive to the tag signal comprising the reflected signal that is reflected by the one or more reflective surfaces.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
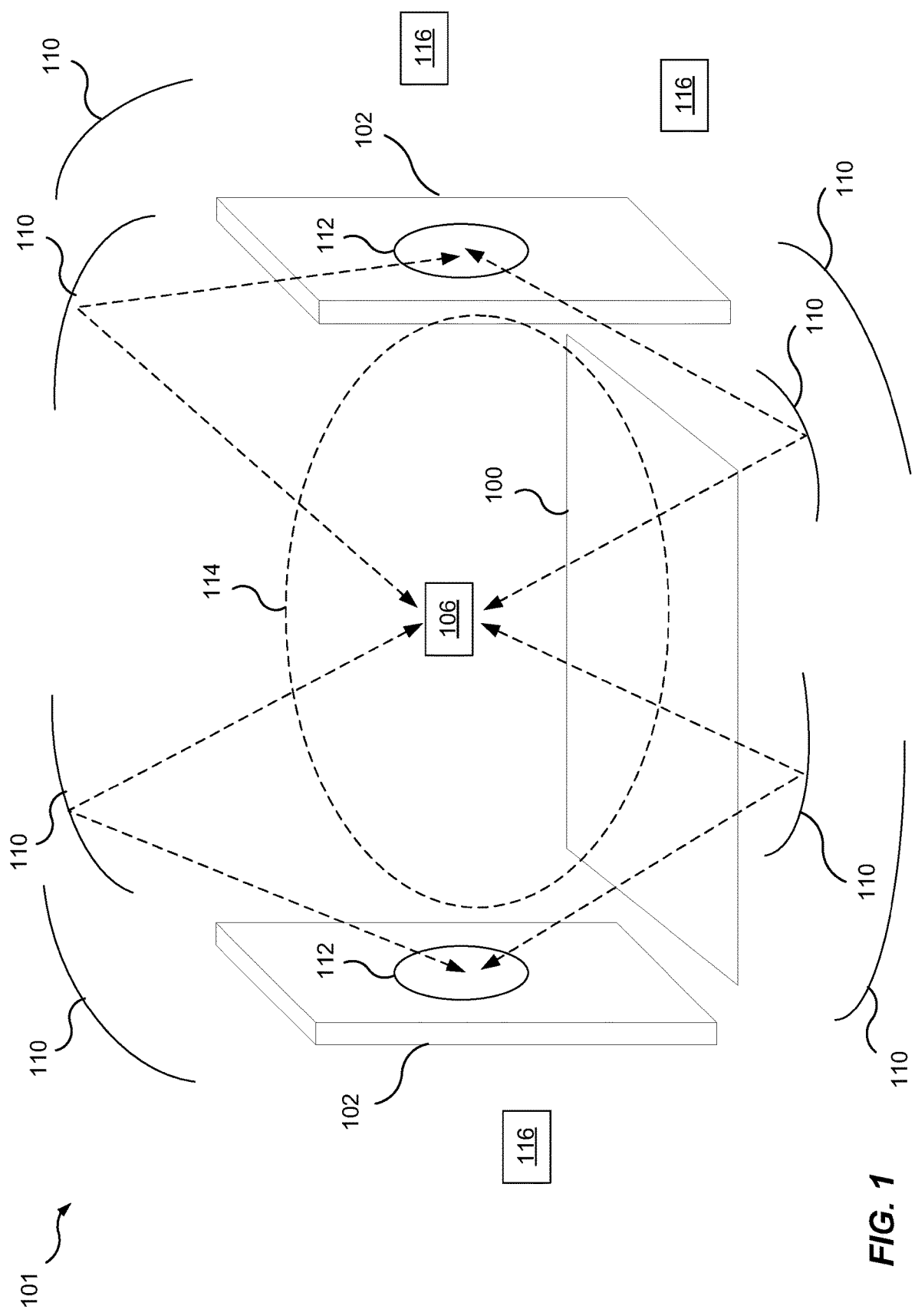
FIG. 1 is a schematic diagram of an example system for tracking/detecting tags, according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide a tag tracking/detection system in which one or more reflective surfaces are configured to focus tag signals of tags that are located in a specific area onto antennas of the system. For instance, in one non-limiting implementation, the one or more reflective surfaces may form one or more parabolic shapes/dishes, and the specific area may be an access control area, such as an area associated with an exit and/or an entrance, through which the tags may move and are to be tracked. However, the present aspects are not so limited. For example, in various example aspects, the reflective surfaces may assume a variety of shapes, curved or flat, and may be located in any position of a retail store. In various example aspects, the reflective surfaces may reflect in different directions and approximate the function of a parabolic dish or other shape. In various example aspects, the reflective surfaces may be made of a material that reflects incident signals, e.g., reflects radio-frequency signals, acousto-magnetic signals, etc. For example, the reflective surfaces may be made of metal, plastic, etc.

In various non-limiting example aspects, the tag tracking/detection system may be or may include a loss prevention system, a supply-chain management system, or any other system in which movement of one or more tags need to be tracked/detected in a target location. For example, the present aspects are applicable to a supply-chain management system for identifying where tagged items have physically moved between or within distribution and/or storage centers. The present aspects are also applicable to loss prevention systems where movement of tags in a portal area or other security area needs to be tracked/detected. Although some present aspects are described below with reference to a loss prevention system, the present aspects are not so limited, and are applicable to any other tag tracking/detection system.

In various non-limiting example aspects, the tag tracking/detection system may include, but is not limited to, a radio-frequency identification (RFID) system, an acousto-magnetic (AM) system, etc.

In an aspect, for example, in an electronic article surveillance system of a retail store where electronic security tags (hereinafter "tags") are attached to retail merchandise to prevent loss, some loss prevention systems may generate false positive alarms due to failure to distinguish between tags that are distributed throughout the retail store and tags which are physically moving across a site threshold (e.g., an exit and/or an entrance). However, some present aspects provide a loss prevention system that correctly identifies tags that are located in specific loss prevention positions, including the site threshold and regions immediately adjacent to the threshold.

In some aspects, reflective surfaces are installed and configured to provide control over the loss prevention locations in which tags are identified by the loss prevention system. The reflective surfaces may include retro-reflective material (e.g., a material with a surface configured to reflect incident radiation back in a direction of the source, as used in roadway signage), where the retro-reflective material are positioned to increase tag reads from only a specific loss prevention location such as an area between opposing pedestals at an entry/exit of the retail store. In an aspect, the reflective surfaces do not substantially affect tag reads from locations outside the target loss prevention location, such as racks or shelves nearby the entry/exit of the retail store. Accordingly, the present aspects reduce loss prevention false positive alarms while also allowing for improved loss prevention true positive alarms. Further, by reflecting tag signals of a tag from multiple reflective surfaces, the present aspects provide multiple directions from which the tag can be read by the loss prevention system, thereby increasing resilience to organized crime activities aimed at obstructing the tag signals of stolen merchandise.

In an aspect, the reflective surfaces may include at least one flat surface. In alternative or additional aspects, the reflective surfaces may include at least one surface that is at least partially curved to improve reflection toward antennas of the loss prevention system. For example, in one non-limiting aspect, the reflective surfaces may include a curved or at least partially non-flat retro-reflective tape with a concavity directed toward the antennas of the loss prevention system and configured to focus reflections toward the antennas of the loss prevention system.

In an aspect, in addition to focusing tag reflections toward the antennas of the loss prevention system, the reflective surfaces may also focus antenna signals of the antennas of the loss prevention system onto the tags in a target loss prevention location to better excite and read the tags in the target loss prevention location.

In an aspect, the reflective surfaces may be made of a material that reflects electromagnetic radiation within the spectrum of the loss prevention system. For example, in an aspect, the loss prevention system may include an RFID system, and the reflective surfaces may be made of a material that reflects electromagnetic radiation within the RFID spectrum. In another example, the loss prevention system may include an AM system, and the reflective surfaces may be made of a material that reflects electromagnetic radiation within the AM spectrum.

In an aspect, the reflective surfaces may be covered with concave cavities with internal geometrical shapes configured for reflecting a received signal toward the signal source or for reflecting a received signal with an angular offset with respect to the signal source (e.g., with an angular offset of 30 to 60 degrees). In various aspects, for example, the concave cavities may have be u-shaped, may have a pyramid or diamond shape, etc.

In an aspect, instead of or in addition to the reflective surfaces, one or more active (e.g., powered) signal repeaters may be implemented to further amplify and reflect the tag signals of tags in a target loss prevention location toward the antennas of the loss prevention system, or amplify and reflect the antenna signals of the antennas of the loss prevention system toward tags in a target loss prevention location. Accordingly, the active signal repeaters may further enhance the reading of tags in the target loss prevention location.

In some implementations, the reflective surfaces may include retro-reflectors constructed of a wide variety of material and may be positioned on the ceiling or floor and/or on loss prevention pedestals and/or any other surface in a vicinity of in a target loss prevention location.

In some implementations, instead of or in addition to retro-reflective material, quasi-retro-reflective material may be configured and produced to cause directed reflections to create a complete parabolic antenna dish where a larger region of tag positions all focus reflections onto a single antenna. For example, in one non-limiting aspect, in order to produce quasi-retro-reflective material, a retro-reflective material with ninety-degree tiled-cube reflective geometrical pattern may be physically stretched in one dimension. Accordingly, the original "square" cubic shapes in the retro-reflective material become elongated in one direction, and therefore will no longer have ninety-degree angles between them. As a result, while the retro-reflective material was originally configured to reflect electromagnetic signals in a direction that is parallel to the signal origin, the quasi-retro-reflective material produced by stretching the retro-reflective material reflects electromagnetic signals in a particular angle with respect to the signal origin, such that the reflection direction is in line with, or at least tilted toward, the direction that the retro-reflective material was stretched.

In some implementations, the reflective surfaces may be made less obtrusive by being configured into other systems. For example, in an aspect, a reflective material may be implemented beneath an outer surface of a wall, floor, ceiling, shelf, opposing pedestal, etc. The outer surface which covers the reflective material may be transparent or colored in various aspects.

Turning now to the figures, example aspects are depicted with reference to one or more components described herein, where components in dashed lines may be optional.

Referring to FIG. 1, in one non-limiting aspect, an example tag tracking/detection system 101 (which may be, for example, an RFID system or an AM system) includes two opposing pedestals 102 installed at an entryway 100 and configured to read/detect a tag 106 (which may be an RFID tag or an AM tag) that is moving through the entryway 100 (or "leaving the site"), and one or more retro-reflectors 110 are configured around the entryway 100 as one or more parabolic dishes to focus reflections off the tag 106 that is within a target location 114 (e.g., crossing the entryway) onto antennas 112 of the pedestals 102.

In an aspect, for example, the target location 114 may be at least a portion of a region or volume between the pedestals 102, or at least a portion of the region or volume between the pedestals 102 and additionally including at least a portion of an adjacent region or volume immediately adjacent to entering or leaving the region or volume between the pedestals 102.

The configuration of the retro-reflectors 110 is such that the retro-reflectors 110 only reflect the signals from the tag 106 which is within the target location 114 back to the antennas 112 of the pedestals 102, while the retro-reflectors 110 have less or no effect on the signals from tags 116 that are outside the target location 114 (e.g., tags that are located behind the pedestals 102, on a shelf in a store, etc.). Accordingly, based on this configuration of the retro-reflectors 110, the antennas 112 of the pedestals 102 have significantly stronger read rate of the tag 106 that is within the target location 114 as compared to the tags 116 that are outside the target location 114. Therefore, the present aspects may distinguish the reading of the tag 106 that is within the target location 114 from the tags 116 that are outside the target location 114.

The present aspects increase resilience to blocking of tags by organized retail crime (ORC) since the retro-reflectors 110 provide more angles for reflecting and reading tag signals.

In some implementations, the retro-reflectors 110 may be made of retro-reflective tape, such as but not limited to those used in roadways. In some implementations, the retro-reflectors 110 may be flexibly/freely positioned in a variety of places, and may optionally be protected with other material in order to survive difficult environments (e.g., a store floor). In some implementations, the retro-reflectors 110 may be made less obtrusive by being designed/implemented into other systems (e.g., into a door, a false ceiling, a pedestal, etc.). In some aspects, for example, the retro-reflectors 110 may be configured on or within the floor adjacent to the pedestals 102, configured on or within the ceiling adjacent to the pedestals 102, configured on or within a wall, a rack, a shelf, a door, or another surface adjacent to the pedestals 102, etc., for example, as described below with reference to FIG. 2.

In some implementations, the retro-reflectors 110 may include straight retro-reflective tape or at least partially curved retro-reflective tape.

Figure 2:
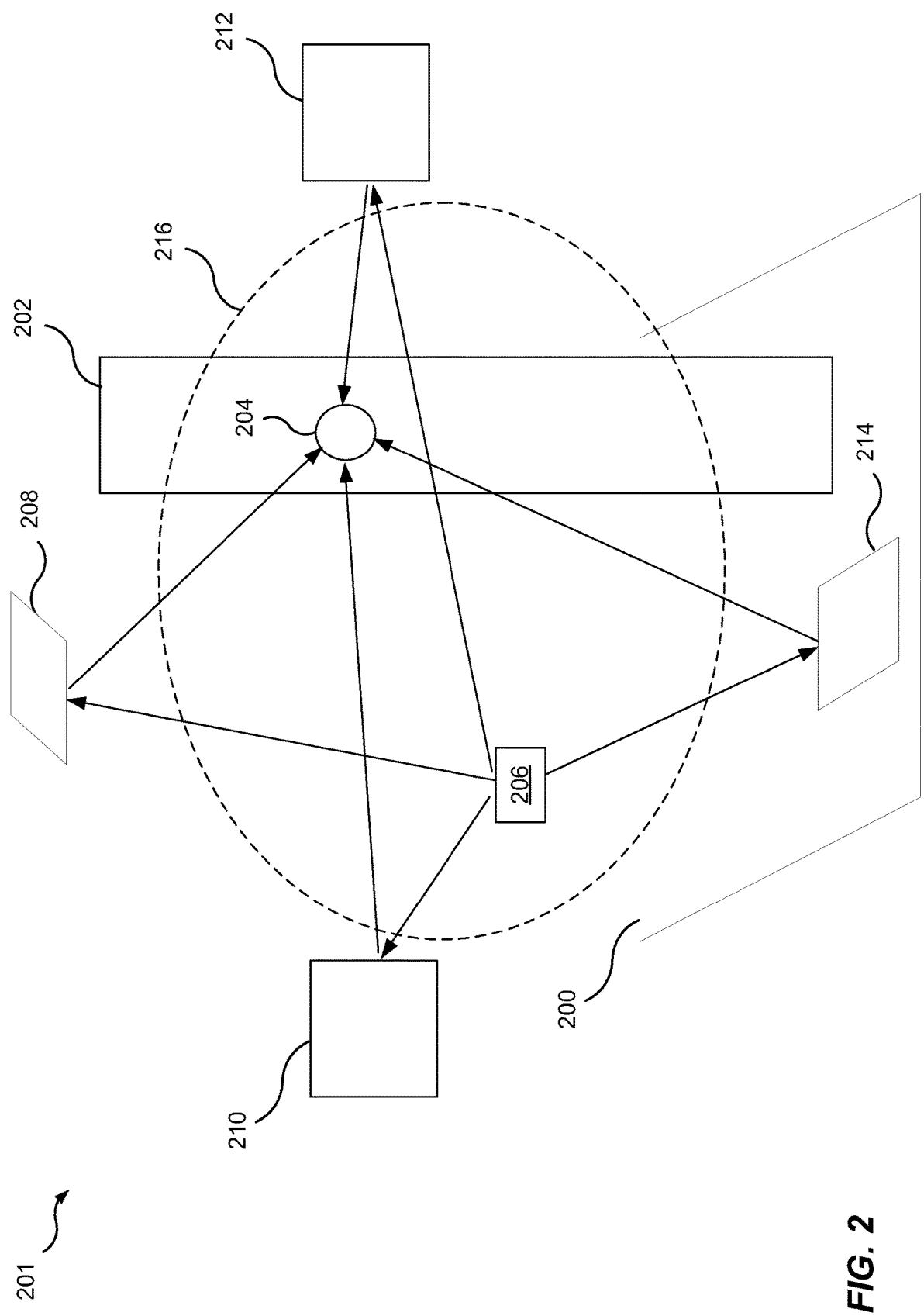
FIG. 2 is a schematic diagram of another example system for tracking/detecting tags, according to aspects of the present disclosure.

Referring to FIG. 2, in another non-limiting aspect, another example tag tracking/detection system 201 (which may be, for example, an RFID system or an AM system) includes a pedestal 202 installed at an entryway 200 and configured to read/detect a tag 206 (which may be an RFID tag or an AM tag) that is moving through the entryway 200 (or "leaving the site"), and one or more retro-reflectors 208, 210, 212, 214 are configured around the entryway 200 to focus reflections off the tag 206 that is within a target location 216 (e.g., crossing the entryway) onto an antenna 204 of the pedestal 202.

The retro-reflectors 208, 210, 212, 214 each have a reflective surface and are configured/positioned to focus and direct reflections from a tag 206 in the target location 216 onto the antenna 204 of the pedestal 202 from multiple distinct directions. For example, in the example implementation in FIG. 2, a first retro-reflector 210 is configured in front of the pedestal 202 (e.g., on a wall in front of the pedestal 202, on an opposing pedestal, etc.), a second retro-reflector 212 is configured behind the pedestal 202 (e.g., on a wall or shelf behind the pedestal 202, etc.), a third retro-reflector 214 is configured on the floor adjacent to the pedestal 202 (e.g., on the floor between two opposing pedestals), and a fourth retro-reflector 208 is configured on the ceiling adjacent to the pedestal 202 (e.g., on the ceiling between two opposing pedestals).

In one implementation, the retro-reflectors 208, 210, 212, 214 may create a visually identifiable physical threshold around the pedestal 202. In one implementation, the retro-reflectors 208, 210, 212, 214 increase tag read coverage or make it more difficult to hide a tag signal of tags in the target location 216 from the antenna 204 of the pedestal 202. In one implementation, the retro-reflectors 208, 210, 212, 214 may be made of automotive retro-reflective tape.

In one implementation, the installation location of the retro-reflectors 208, 210, 212, 214 and the tag location of the tag 206 affects the rate at which tag reads occur. Accordingly, in one non-limiting implementation, for example, the tag 206 may be moved, for example, around an area between two opposing pedestals to identify a boundary for the installation location of the retro-reflectors 208, 210, 212, 214.

In one implementation, a machine learning classification system may be configured and trained to analyze tag data (e.g., RFID or AM data) to distinguish read patterns associated with tags moving through the target location 216 from read patterns associated with tags that are outside the target location 216. In an aspect, for example, a boundary may be established, where a difference in tag position within, for example, 12 inches of the boundary creates a different data pattern. In one non-limiting implementation, for example, a decision tree classifier may be used to develop a machine learning model for analyzing tag data to identify tags moving through the target location 216 from tags outside of the target location 216. In an aspect, the decision tree classifier may classify the reads in order to help identify a tag going through the target location in order to reduce false alarms.

Figure 3:
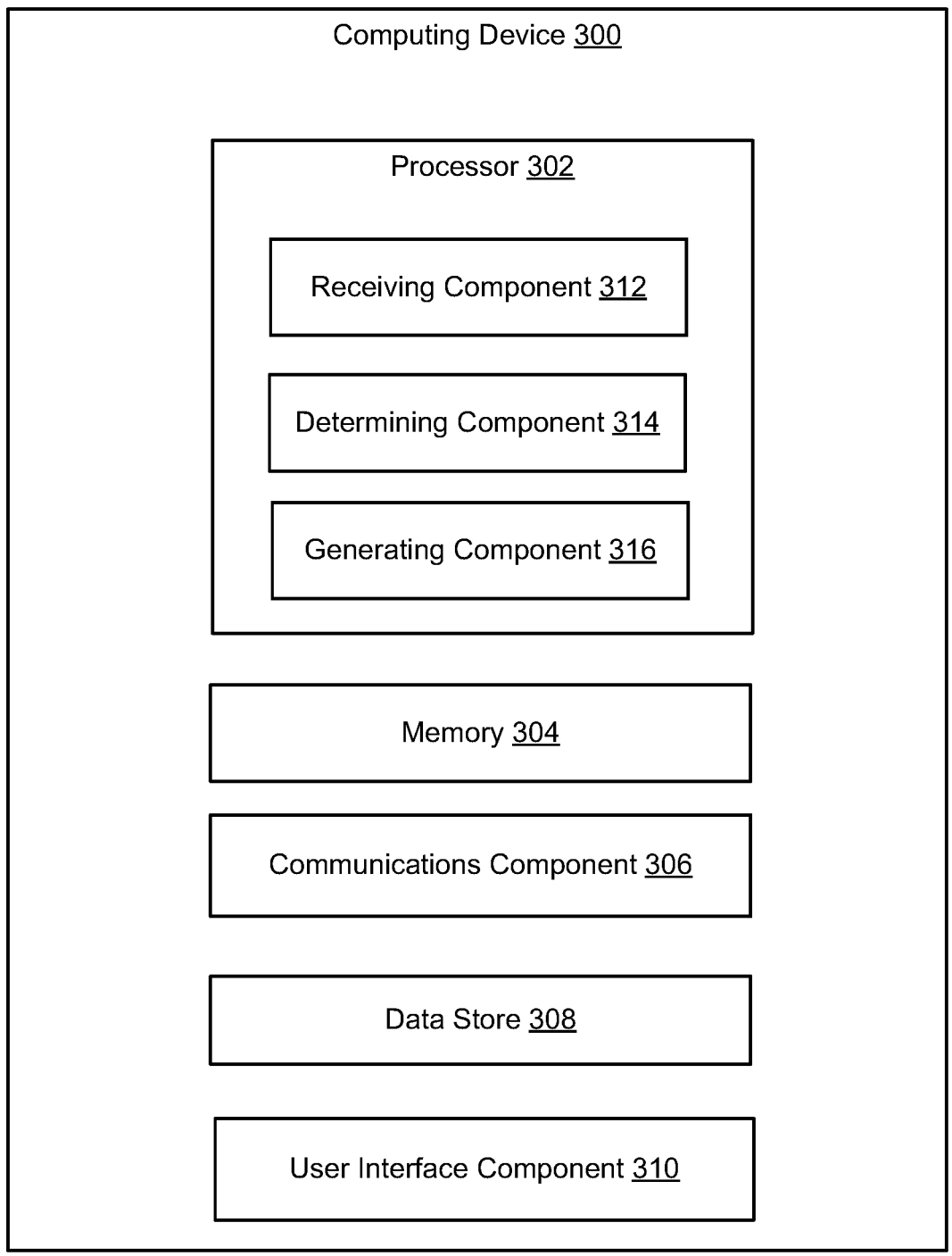
FIG. 3 is a block diagram of an example computing device which may implement a component in the example systems of FIG. 1 or 2, according to aspects of the present disclosure.

FIG. 3 illustrates an example block diagram providing details of computing components in a computing device 300 that may implement all or a portion of the pedestals 102, 202, tags 106, 116, 206, antennas 112, 204, or any other component in the example tag tracking/detection system in FIG. 1 or in the example tag tracking/detection system in FIG. 2. The computing device 300 includes a processor 302 which may be configured to execute or implement software, hardware, and/or firmware modules that perform any tag tracking/detection functionality described herein with reference to pedestals 102, 202, tags 106, 116, 206, antennas 112, 204, or any other component in the first example tag tracking/detection system in FIG. 1 or in the second example tag tracking/detection system in FIG. 2.

The processor 302 may be a micro-controller and/or may include a single or multiple set of processors or multi-core processors. Moreover, the processor 302 may be implemented as an integrated processing system and/or a distributed processing system. The computing device 300 may further include a memory 304, such as for storing local versions of applications being executed by the processor 302, related instructions, parameters, etc. The memory 304 may include a type of memory usable by a computer, such as random access memory (RAM), read only memory (ROM), tapes, magnetic discs, optical discs, volatile memory, non-volatile memory, and any combination thereof. Additionally, the processor 302 and the memory 304 may include and execute an operating system executing on the processor 302, one or more applications, display drivers, etc., and/or other components of the computing device 300.

Further, the computing device 300 may include a communications component 306 that provides for establishing and maintaining communications with one or more other devices, parties, entities, etc. utilizing hardware, software, and services. The communications component 306 may carry communications between components on the computing device 300, as well as between the computing device 300 and external devices, such as devices located across a communications network and/or devices serially or locally connected to the computing device 300. For example, the communications component 306 may include one or more buses, and may further include transmit chain components and receive chain components associated with a wireless or wired transmitter and receiver, respectively, operable for interfacing with external devices.

Additionally, the computing device 300 may include a data store 308, which can be any suitable combination of hardware and/or software, that provides for mass storage of information, databases, and programs. For example, the data store 308 may be or may include a data repository for applications and/or related parameters not currently being executed by processor 302. In addition, the data store 308 may be a data repository for an operating system, application, display driver, etc., executing on the processor 302, and/or one or more other components of the computing device 300.

The computing device 300 may also include a user interface component 310 operable to receive inputs from a user of the computing device 300 and further operable to generate outputs for presentation to the user (e.g., via a display interface to a display device). The user interface component 310 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 310 may include one or more output devices, including but not limited to a display interface, a speaker, a haptic feedback mechanism, a printer, any other mechanism capable of presenting an output to a user, or any combination thereof.

Figure 4:
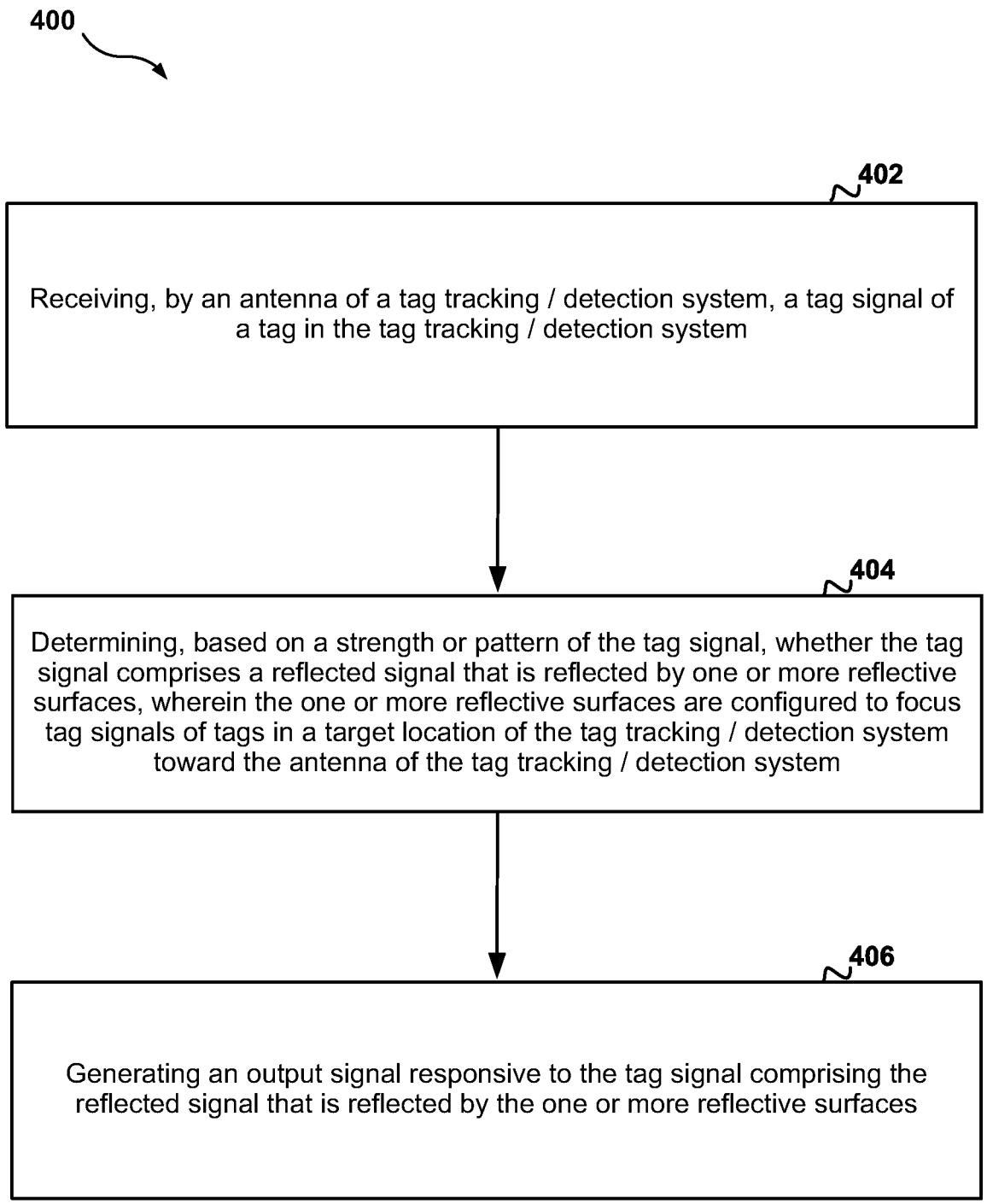
FIG. 4 is a flow diagram of an example method of tracking/detecting tags, according to aspects of the present disclosure.

FIG. 4 is a flowchart of a method 400 of tag tracking/detection. The method 400 may implement the tag tracking/detection functionality described herein with reference to FIGS. 1-3 above, and may be performed by one or more components of the computing device 300 and/or one or more components in the first example tag tracking/detection system 101 or in the second example tag tracking/detection system 201, such as all or a portion of the pedestals 102, 202, tags 106, 116, 206, antennas 112, 204, or any other component described herein with reference to FIGS. 1-3 above.

At 402, the method 400 includes receiving, by an antenna of a tag tracking/detection system, a tag signal of a tag in the tag tracking/detection system. For example, in an aspect, the computing device 300 and/or receiving component 312 and/or one or more components in the first example tag tracking/detection system 101 or in the second example tag tracking/detection system 201, such as all or a portion of the pedestals 102, 202, tags 106, 116, 206, and/or antennas 112, 204 may be configured to or may comprise means for receiving, by an antenna of a tag tracking/detection system, a tag signal of a tag in the tag tracking/detection system.

For example, in an aspect, referring to FIG. 1, the antenna 112 of the pedestal 102 may receive a tag signal of the tag 106 in the target location 114 and reflected by one or more of the retro-reflectors 110, or may directly receive a tag signal of one of the other tags 116 outside the target location 114.

At 404, the method 400 includes determining, based on a strength or pattern of the tag signal, whether the tag signal comprises a reflected signal that is reflected by one or more reflective surfaces, wherein the one or more reflective surfaces are configured to focus tag signals of tags in a target location of the tag tracking/detection system toward the antenna of the tag tracking/detection system. For example, in an aspect, the computing device 300 and/or determining component 314 and/or one or more components in the first example tag tracking/detection system 101 or in the second example tag tracking/detection system 201, such as all or a portion of the pedestals 102, 202, tags 106, 116, 206, and/or antennas 112, 204 may be configured to or may comprise means for determining, based on a strength or pattern of the tag signal, whether the tag signal comprises a reflected signal that is reflected by one or more reflective surfaces, wherein the one or more reflective surfaces are configured to focus tag signals of tags in a target location of the tag tracking/detection system toward the antenna of the tag tracking/detection system.

For example, in an aspect, referring to FIG. 1, the tag signal received by the antenna 112 of the pedestal 102 may be provided to a machine learning classification model, such as but not limited to a decision tree classifier, to determine whether the tag signal is from a tag 106 in the target location 114 and is reflected by one or more of the retro-reflectors 110, or whether the tag signal is directly received from the tags 116 outside the target location 114. In an aspect, for example, a tag signal from a tag 106 in the target location 114 is reflected by one or more of the retro-reflectors 110 and is therefore stronger than a tag signal that is directly received from the tags 116 outside the target location 114, and the decision tree is trained and configured to identify such differences in tag signal strength. In an alternative non-limiting example aspect, the tag signal received by the antenna 112 of the pedestal 102 may be compared with an alarm threshold to determine whether the tag signal is from a tag 106 in the target location 114 and is reflected by one or more of the retro-reflectors 110, or whether the tag signal is directly received from the tags 116 outside the target location 114.

At 406, the method 400 includes generating an output signal responsive to the tag signal comprising the reflected signal that is reflected by the one or more reflective surfaces. For example, in an aspect, the computing device 300 and/or generating component 316 and/or one or more components in the first example tag tracking/detection system 101 or in the second example tag tracking/detection system 201, such as all or a portion of the pedestals 102, 202, tags 106, 116, 206, and/or antennas 112, 204 may be configured to or may comprise means for generating an output signal responsive to the tag signal comprising the reflected signal that is reflected by the one or more reflective surfaces.

For example, in an aspect, referring to FIG. 1, if it is determined that the tag signal is from a tag 106 in the target location 114 and is reflected by one or more of the retro-reflectors 110, a loss prevention alarm is generated, for example, by a device such as, but not limited to, a speaker, a lighting device/display, etc. For example, in various aspects, the loss prevention alarm may include an audible alarm generated at the entryway 100, a visual alarm generated at the entryway 100, an alarm message transmitted to a workstation/monitoring center of the loss prevention system 101, etc.

In one optional implementation, the tag tracking/detection system comprises an RFID system, and the tag comprises an RFID tag.

In one optional implementation, the tag tracking/detection system comprises an AM system, and the tag comprises an AM tag.

In one optional implementation, the one or more reflective surfaces comprise retro-reflective material.

In one optional implementation, the antenna is configured in a pedestal at an entryway.

In one optional implementation, the one or more reflective surfaces comprise at least one reflective surface configured on or within another pedestal opposing the pedestal at the entryway.

In one optional implementation, the one or more reflective surfaces comprise at least one reflective surface configured on or within a ceiling or floor adjacent to the pedestal at the entryway.

In one optional implementation, the one or more reflective surfaces comprise at least one reflective surface configured on or within a surface in front of or behind the pedestal at the entryway.

In one optional implementation, the one or more reflective surfaces form a parabolic dish configured to focus the tag signals of the tags in the target location of the tag tracking/detection system toward the antenna of the tag tracking/detection system.

In one optional implementation, the determining at block 404 comprises determining by a machine learning classification model.

In one optional implementation, the determining at block 404 comprises comparing the strength or pattern of the tag signal with an alarm threshold.

In one optional implementation, the tag tracking/detection system comprises an electronic article surveillance system.

In one optional implementation, the output signal comprises a loss prevention alarm.

In one optional implementation, the tag tracking/detection system comprises a supply-chain management system.

In one optional implementation, the output signal indicates a physical movement of the tag between or within one or more distribution or storage centers in the supply-chain management system.

Some further example aspects are provided below.

1. A method of tag tracking/detection, comprising:
receiving, by an antenna of a tag tracking/detection system, a tag signal of a tag in the tag tracking/detection system;
determining, based on a strength or pattern of the tag signal, whether the tag signal comprises a reflected signal that is reflected by one or more reflective surfaces, wherein the one or more reflective surfaces are configured to focus tag signals of tags in a target location of the tag tracking/detection system toward the antenna of the tag tracking/detection system; and
generating an output signal responsive to the tag signal comprising the reflected signal that is reflected by the one or more reflective surfaces, wherein the output signal is indicative of the tag being detected in the target location.

2. The method of clause 1, wherein the tag tracking/detection system comprises a radio-frequency identification (RFID) system, wherein the tag comprises an RFID tag.

3. The method of clause 1, wherein the tag tracking/detection system comprises an acousto-magnetic (AM) system, wherein the tag comprises an AM tag.

4. The method of any one of the above clauses, wherein the one or more reflective surfaces comprise retro-reflective material.

5. The method of any one of the above clauses, wherein the antenna is configured in a pedestal at an entryway.

6. The method of clause 5, wherein the one or more reflective surfaces comprise at least one reflective surface configured on or within another pedestal opposing the pedestal at the entryway.

7. The method of clause 5 or 6, wherein the one or more reflective surfaces comprise at least one reflective surface configured on or within a ceiling or floor adjacent to the pedestal at the entryway.

8. The method of any one of clauses 5 to 7, wherein the one or more reflective surfaces comprise at least one reflective surface configured on or within a surface in front of or behind the pedestal at the entryway.

9. The method of any one of the above clauses, wherein the one or more reflective surfaces form a parabolic dish configured to focus the tag signals of the tags in the target location of the system toward the antenna of the system.

10. The method of any one of the above clauses, wherein the determining comprises determining by a machine learning classification model.

11. The method of any one of the above clauses, wherein the determining comprises comparing the strength or pattern of the tag signal with an alarm threshold.

12. The method of any one of the above clauses, wherein the tag tracking/detection system comprises an electronic article surveillance system.

13. The method of clause 12, wherein the output signal comprises a loss prevention alarm.

14. The method of any one of clauses 1 to 11, wherein the tag tracking/detection system comprises a supply-chain management system.

15. The method of clause 14, wherein the output signal indicates a physical movement of the tag between or within one or more distribution or storage centers in the supply-chain management system.

16. A tag tracking/detection system, comprising:
an antenna; and
one or more reflective surfaces configured to focus tag signals of tags in a target location of the tag tracking/detection system toward the antenna of the tag tracking/detection system.

17. The tag tracking/detection system of clause 16, wherein the tag tracking/detection system is configured to:
receive, by the antenna of the tag tracking/detection system, a tag signal of a tag in the tag tracking/detection system;
determine, based on a strength or pattern of the tag signal, whether the tag signal comprises a reflected signal that is reflected by the one or more reflective surfaces; and
generate an output signal responsive to the tag signal comprising the reflected signal that is reflected by the one or more reflective surfaces, wherein the output signal is indicative of the tag being detected in the target location.

18. The tag tracking/detection system of clause 17, wherein the tag tracking/detection system comprises an electronic article surveillance system, wherein the output signal comprises a loss prevention alarm.

19. The tag tracking/detection system of clause 17, wherein the tag tracking/detection system comprises a supply-chain management system, wherein the output signal indicates a physical movement of the tag between or within one or more distribution or storage centers in the supply-chain management system.

20. A computer-readable medium storing instructions that, when executed by a processor, cause the processor to:
receive, by an antenna of a tag tracking/detection system, a tag signal of a tag in the tag tracking/detection system;
determining, based on a strength or pattern of the tag signal, whether the tag signal comprises a reflected signal that is reflected by one or more reflective surfaces, wherein the one or more reflective surfaces are configured to focus tag signals of tags in a target location of the tag tracking/detection system toward the antenna of the tag tracking/detection system; and
generating an output signal responsive to the tag signal comprising the reflected signal that is reflected by the one or more reflective surfaces.

21. An apparatus comprising a memory storing instructions and a processor communicatively coupled with the memory and configured to execute the instructions to perform the method of any one of clauses 1 to 15.

21. A computer-readable medium storing instructions that, when executed by a processor, cause the processor to perform the method of any one of clauses 1 to 15.

22. The computer-readable medium of clause 21, wherein the computer-readable medium is non-transitory.

24. An apparatus comprising means for performing the method of any one of clauses 1 to 15.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of tag tracking/detection, comprising:
receiving, by an antenna of a tag tracking/detection system, a tag signal of a tag in the tag tracking/detection system;
determining, based on a strength or pattern of the tag signal, whether the tag signal only comprises a direct signal that is directly received from the tag or whether the tag signal comprises the direct signal that is directly received from the tag as well as a reflected signal that is reflected by one or more reflective surfaces, wherein the one or more reflective surfaces are configured to focus tag signals of tags in a target location of the tag tracking/detection system toward the antenna of the tag tracking/detection system;
determining, responsive to the tag signal only comprising the direct signal that is directly received from the tag, that the tag is detected outside the target location; and
generating an output signal responsive to the tag signal comprising the direct signal that is directly received from the tag as well as the reflected signal that is reflected by the one or more reflective surfaces, wherein the output signal is indicative of the tag being detected in the target location.

2. The method of claim 1, wherein the tag tracking/detection system comprises a radio-frequency identification (RFID) system, wherein the tag comprises an RFID tag.

3. The method of claim 1, wherein the tag tracking/detection system comprises an acousto-magnetic (AM) system, wherein the tag comprises an AM tag.

4. The method of claim 1, wherein the one or more reflective surfaces comprise retro-reflective material.

5. The method of claim 1, wherein the antenna is configured in a pedestal at an entryway.

6. The method of claim 5, wherein the one or more reflective surfaces comprise at least one reflective surface configured on or within another pedestal opposing the pedestal at the entryway.

7. The method of claim 5, wherein the one or more reflective surfaces comprise at least one reflective surface configured on or within a ceiling or floor adjacent to the pedestal at the entryway.

8. The method of claim 5, wherein the one or more reflective surfaces comprise at least one reflective surface configured on or within a surface in front of or behind the pedestal at the entryway.

9. The method of claim 1, wherein the one or more reflective surfaces form a parabolic dish configured to focus the tag signals of the tags in the target location of the tag tracking/detection system toward the antenna of the tag tracking/detection system.

10. The method of claim 1, wherein determining whether the tag signal only comprises the direct signal or whether the tag signal comprises the direct signal as well as the reflected signal comprises determining by a machine learning classification model.

11. The method of claim 1, wherein determining whether the tag signal only comprises the direct signal or whether the tag signal comprises the direct signal as well as the reflected signal comprises comparing the strength or pattern of the tag signal with an alarm threshold.

12. The method of claim 1, wherein the tag tracking/detection system comprises an electronic article surveillance system.

13. The method of claim 12, wherein the output signal comprises a loss prevention alarm.

14. The method of claim 1, wherein the tag tracking/detection system comprises a supply-chain management system.

15. The method of claim 14, wherein the output signal indicates a physical movement of the tag between or within one or more distribution or storage centers in the supply-chain management system.

16. A tag tracking/detection system, comprising:
an antenna; and
one or more reflective surfaces configured to focus tag signals of tags in a target location of the tag tracking/detection system toward the antenna of the tag tracking/detection system, wherein the tag tracking/detection system is configured to:
receive, by the antenna, a tag signal of a tag in the tag tracking/detection system;
determine, based on a strength or pattern of the tag signal, whether the tag signal only comprises a direct signal that is directly received from the tag or whether the tag signal comprises the direct signal that is directly received from the tag as well as a reflected signal that is reflected by the one or more reflective surfaces;
determine, responsive to the tag signal only comprising the direct signal that is directly received from the tag, that the tag is detected outside the target location; and
generate an output signal responsive to the tag signal comprising the direct signal that is directly received from the tag as well as the reflected signal that is reflected by the one or more reflective surfaces, wherein the output signal is indicative of the tag being detected in the target location.

17. The tag tracking/detection system of claim 16, wherein the tag tracking/detection system comprises an electronic article surveillance system, wherein the output signal comprises a loss prevention alarm.

18. The tag tracking/detection system of claim 16, wherein the tag tracking/detection system comprises a supply-chain management system, wherein the output signal indicates a physical movement of the tag between or within one or more distribution or storage centers in the supply-chain management system.

19. A non-transitory computer-readable medium storing instructions that, when executed by a processor, cause the processor to:
receive, by an antenna of a tag tracking/detection system, a tag signal of a tag in the tag tracking/detection system;
determine, based on a strength or pattern of the tag signal, whether the tag signal only comprises a direct signal that is directly received from the tag or whether the tag signal comprises the direct signal that is directly received from the tag as well as a reflected signal that is reflected by one or more reflective surfaces, wherein the one or more reflective surfaces are configured to focus tag signals of tags in a target location of the tag tracking/detection system toward the antenna of the tag tracking/detection system;
determine, responsive to the tag signal only comprising the direct signal that is directly received from the tag, that the tag is detected outside the target location; and
generate an output signal responsive to the tag signal comprising the direct signal that is directly received from the tag as well as the reflected signal that is reflected by the one or more reflective surfaces, wherein the output signal is indicative of the tag being detected in the target location.

* * * * *